United States Patent
Kawasaki

(10) Patent No.: US 12,223,381 B2
(45) Date of Patent: Feb. 11, 2025

(54) IMAGE FORMING DEVICE

(71) Applicant: TOSHIBA TEC KABUSHIKI KAISHA, Tokyo (JP)

(72) Inventor: Yuki Kawasaki, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/352,292

(22) Filed: Jul. 14, 2023

(65) Prior Publication Data

US 2023/0359838 A1 Nov. 9, 2023

Related U.S. Application Data

(63) Continuation of application No. 17/529,473, filed on Nov. 18, 2021, now Pat. No. 11,741,321.

(30) Foreign Application Priority Data

May 20, 2021 (JP) ................. 2021-085298

(51) Int. Cl.
- *G06K 7/10* (2006.01)
- *G06K 19/07* (2006.01)
- *H04N 1/32* (2006.01)
- *B41J 29/38* (2006.01)
- *G03G 15/00* (2006.01)

(52) U.S. Cl.
CPC ..... *G06K 7/10297* (2013.01); *G06K 19/0723* (2013.01); *H04N 1/32138* (2013.01); *B41J 29/38* (2013.01); *G03G 15/50* (2013.01)

(58) Field of Classification Search
CPC .......... G06K 7/10297; G06K 19/0723; H04N 1/32138
USPC ................................ 235/472.02
See application file for complete search history.

(56) References Cited

U.S. PATENT DOCUMENTS

| | | | |
|---|---|---|---|
| 9,818,006 B1 | 11/2017 | Hale et al. | |
| 10,725,409 B1 | 7/2020 | Sato | |
| 11,741,321 B2 * | 8/2023 | Kawasaki | H04N 1/32138 235/472.02 |
| 2002/0170973 A1 | 11/2002 | Teraura | |

(Continued)

FOREIGN PATENT DOCUMENTS

JP 2008-70940 3/2008

OTHER PUBLICATIONS

Non-Final Office Action for U.S. Appl. No. 17/529,473 mailed Dec. 19, 2022.

(Continued)

*Primary Examiner* — Ahshik Kim
(74) *Attorney, Agent, or Firm* — Amin, Turocy & Watson, LLP

(57) ABSTRACT

According to one embodiment, there is provided an image forming device that prevents write information from being incorrectly written to a non-target RFID tag. The image forming device according to the embodiment includes: a placement unit, a wireless tag communication unit, and a conductor. A sheet provided with a wireless tag can be placed in the placement unit. The wireless tag communication unit can write information to the wireless tag provided on the sheet. The conductor is provided in the placement unit and hinders communication between the wireless tag communication unit and the wireless tag.

20 Claims, 6 Drawing Sheets

(56) References Cited

U.S. PATENT DOCUMENTS

| | | | |
|---|---|---|---|
| 2004/0257601 A1 | 12/2004 | Tomiyasu et al. | |
| 2007/0133039 A1* | 6/2007 | Yamada | H04N 1/32635 |
| | | | 358/1.14 |
| 2018/0165487 A1 | 6/2018 | Hori | |
| 2018/0341243 A1 | 11/2018 | Oishi | |
| 2020/0293244 A1 | 9/2020 | Takada | |
| 2021/0064951 A1 | 3/2021 | Koike | |
| 2021/0377418 A1 | 12/2021 | Ishida | |

OTHER PUBLICATIONS

Extended European Search Report for European Patent Application No. 22160434.1 dated Aug. 12, 2022.

* cited by examiner

IMAGE FORMING DEVICE

CROSS-REFERENCE TO RELATED APPLICATIONS

This application is a Continuation of application Ser. No. 17/529,473 filed on Nov. 18, 2021, the entire contents of which are incorporated herein by reference.

This application is based upon and claims the benefit of priority from Japanese Patent Application No. 2021-085298, filed on May 20, 2021, the entire contents of which are incorporated herein by reference.

FIELD

Embodiments described herein relates to an image forming device.

BACKGROUND

There is an image forming device that writes on a wireless tag and forms an image on a sheet with the wireless tag using a radio frequency identifier (RFID) technique. When a wireless tag to be written (hereinafter, referred to as "target tag") passes through a conveying path, the image forming device writes information to the target tag by emitting a radio wave from an antenna to the target tag.

Generally, when a plurality of sheets are placed on a placement unit such as a tray or a sheet feeding cassette on which sheets can be placed, wireless tags are overlapped. It is difficult for the overlapped wireless tags to receive the radio wave due to the overlapping. Therefore, the image forming device cannot communicate with the overlapped wireless tags. Meanwhile, the image forming device can communicate with a non-overlapped wireless tag such as a wireless tag passing through the conveying path. There is a technique of determining whether or not a tag is the target tag based on strength (received signal strength indication (RSSI)) of a radio signal transmitted from the wireless tag by using this property and writing information to the target tag.

However, for example, when only one sheet remains in the tray, the wireless tag attached to the sheet is not overlapped. Therefore, the image forming device receives not only the radio wave from the wireless tag that is being conveyed but also the radio wave from the wireless tag attached to the sheet remaining in the tray. In this case, it is difficult for the image forming device to distinguish between the wireless tag attached to the sheet that is being conveyed and the wireless tag attached to the sheet remaining in the tray. As a result, the image forming device may incorrectly write the information to the wireless tag other than the target tag.

DETAILED DESCRIPTION

In general, according to one embodiment, there is provided an image forming device that prevents incorrectly writing information to a non-target wireless tag.

An image forming device according to an embodiment includes a placement unit, a wireless tag communication unit, and a conductor. A sheet provided with a wireless tag can be placed in the placement unit. The wireless tag communication unit can write information to the wireless tag provided on the sheet. The conductor is provided in the placement unit and hinders communication between the wireless tag communication unit and the wireless tag.

In an image forming device of an embodiment, information is prevented from being incorrectly written to a non-target wireless tag. Hereinafter, the image forming device of the embodiment will be described in detail.

Figure 1:
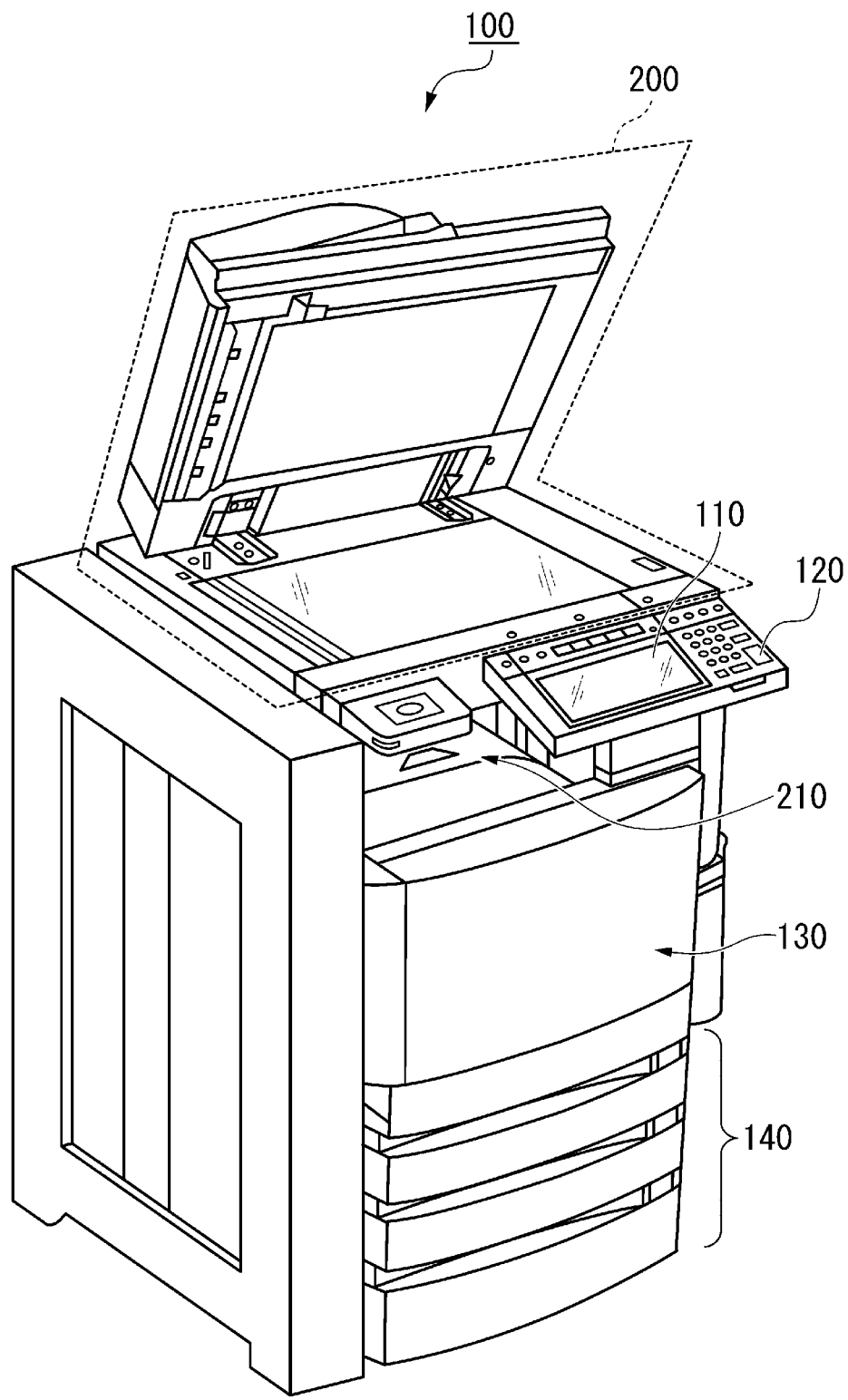
FIG. 1 is an external view showing an example of an overall configuration of an image forming device according to an embodiment.

FIG. 1 is an external view showing an example of an overall configuration of an image forming device 100 according to the embodiment. The image forming device 100 is, for example, a multifunction device. The image forming device 100 includes a display 110, a control panel 120, a printer unit 130, a sheet storage unit 140, and an image reading unit 200. The printer unit 130 of the image forming device 100 may be an electrophotographic type device that fixes a toner image, or an inkjet type device.

The image forming device 100 forms an image on a sheet by using a developer such as toner. The sheet is, for example, paper or label paper. The sheet may be a sheet to which a wireless tag is attached. The sheet may be any material as long as the image forming device 100 can form an image on a surface thereof. As the sheet to which the wireless tag is attached, the wireless tag may be attached to the surface of the sheet, or the wireless tag may be embedded inside the sheet. The wireless tag in the present embodiment is a wireless tag using a radio frequency identifier (RFID) technique, and is also called an RF tag.

The display 110 is an image display device such as a liquid crystal display or an organic electro luminescence (EL) display. The display 110 displays various kinds of information related to the image forming device 100.

The control panel 120 includes a plurality of buttons. The control panel 120 receives an operation of a user. The control panel 120 outputs a signal corresponding to the operation performed by the user to a control unit of the image forming device 100. The display 110 and the control panel 120 may be configured as an integrated touch panel.

The printer unit 130 forms an image on the sheet based on image information generated by the image reading unit 200 or image information received via a communication path. The printer unit 130 forms the image by, for example, the following processing. The printer unit 130 forms an electrostatic latent image on a photoconductor drum based on the image information. The printer unit 130 forms a visible image by making the developer adhere to the electrostatic latent image. The toner is a specific example of the developer. The printer unit 130 transfers the visible image to the sheet. The printer unit 130 fixes the visible image on the sheet by heating and pressurizing the sheet. The sheet on which the image is formed may be a sheet stored in the sheet storage unit 140 or a hand-pointed sheet. The sheet on which the image is formed is discharged to a paper discharge unit 210.

The sheet storage unit 140 stores a sheet used for image formation in the printer unit 130. In the present embodiment, the sheet storage unit 140 is provided with four paper feed cassettes. The image reading unit 200 reads the image information to be read as an intensity of light. The image reading unit 200 records the read image information. The recorded image information may be transmitted to another information processing device through a network. The recorded image information may be used to form an image on the sheet by the printer unit 130.

Figure 2:
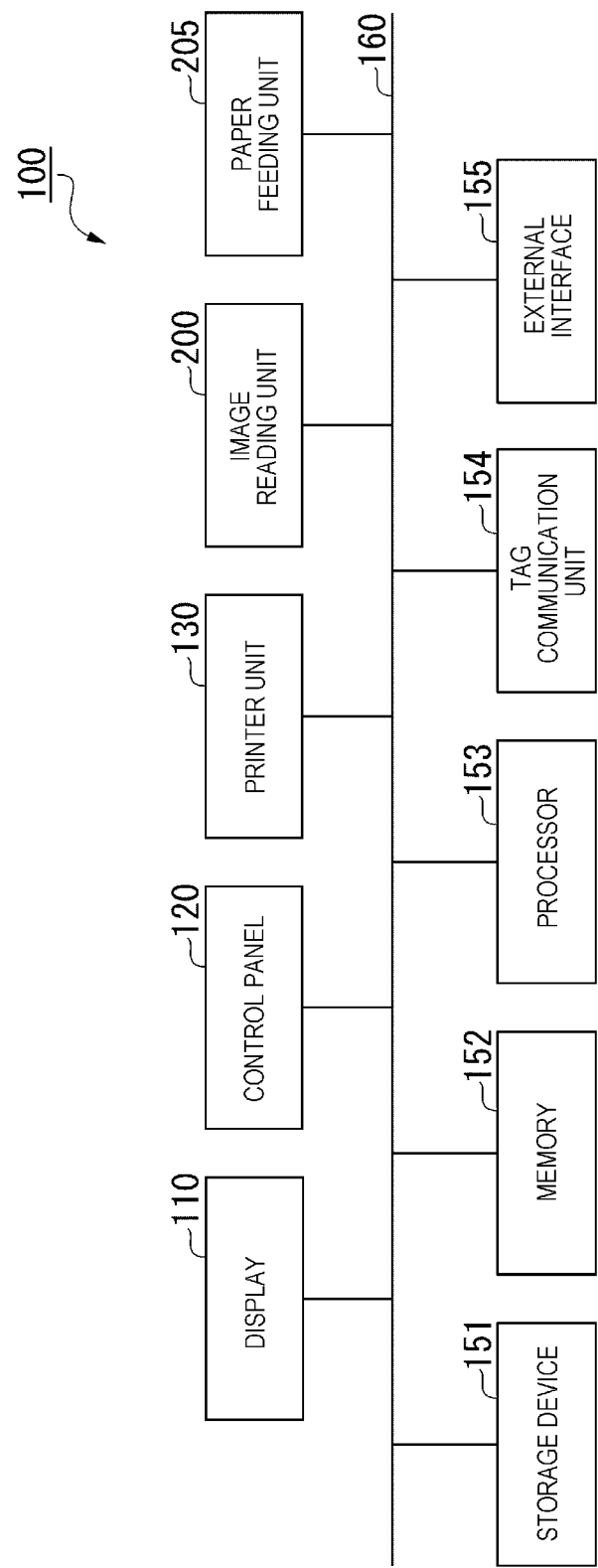
FIG. 2 is a block diagram showing a hardware configuration.

FIG. 2 is a block diagram showing a hardware configuration of the image forming device 100 according to the embodiment. The image forming device 100 includes the display 110, the control panel 120, the printer unit 130, a paper feeding unit 205, a storage device 151, a memory 152, a processor 153, a wireless tag communication unit 154, an external interface 155, and the image reading unit 200. The display 110, the control panel 120, the printer unit 130, and the image reading unit 200 have been described above, and thus the description thereof will be omitted. The paper feeding unit 205 is a mechanism that feeds sheets placed in the sheet storage unit 140 and a manual feed tray described later to the printer unit 130. Hereinafter, the storage device 151, the memory 152, the processor 153, the wireless tag communication unit 154, and the external interface 155 will be described. The functional units are connected via a system bus 160 in a data communicable manner.

The storage device 151 is, for example, a hard disk drive or a solid state drive (SSD), and stores various kinds of data. The various kinds of data are a print job received from an external communication device and a software program for controlling an operation of each functional unit of the image forming device 100. The print job may be a job related to double-sided printing or a job related to printing of a plurality of sheets. The print job may include image information related to an image to be printed on the sheet.

The memory 152 temporarily stores data used by each functional unit provided in the image forming device 100. The memory 152 is a random access memory (RAM), for example. The memory 152 may store digital data generated by the image reading unit 200. The memory 152 may temporarily store the print job being performed by the printer unit 130 and writing information to be written to the wireless tag.

The processor 153 controls the operation of each functional unit of the image forming device 100. The processor 153 executes the processing by loading the software program stored in the storage device 151 into the memory 152, and executing the software program. Here, specific processing of the processor 153 will be described with an example.

The processor 153 controls printing on a sheet with a wireless tag based on a print job received via the external communication device or the control panel 120. Upon receiving the print job related to the sheet with the wireless tag, the processor 153 acquires write information specified in the print job and image information associated with the write information from, for example, a write information server not shown. The image information associated with the written information is information related to the image to be formed on the sheet. The image information does not necessarily have to be associated with the written information. In this case, the image information may be included in the print job. The processor 153 controls the paper feeding unit 205. The paper feeding unit 205 feeds the sheet with the wireless tag.

The processor 153 controls the printer unit 130. The printer unit 130 forms an image indicated by the image information on the sheet. The sheet on which the image is formed is discharged to the paper discharge unit 210. The processor 153 controls the wireless tag communication unit 154. The wireless tag communication unit 154 includes an arithmetic device and a storage device. The wireless tag communication unit 154 writes information to the wireless tag provided on the sheet. Further, the wireless tag communication unit 154 reads information from the wireless tag provided on the sheet. The wireless tag communication unit 154 reads, for example, identification information (for example, Unique Identifier (UID)) that uniquely identifies the wireless tag.

Data transmission/reception with another device is performed via the external interface 155. Here, the other device is, for example, an information processing device such as a personal computer, a tablet computer, or a smart device. The external interface 155 operates as an input interface and receives data or an instruction transmitted from the other device. The instruction transmitted from the other device is the print job or the like. The data transmitted from the other device is the write information, the image information associated with the write information, and the like. Further, the external interface 155 operates as an output interface and transmits data to the other device.

Figure 3:
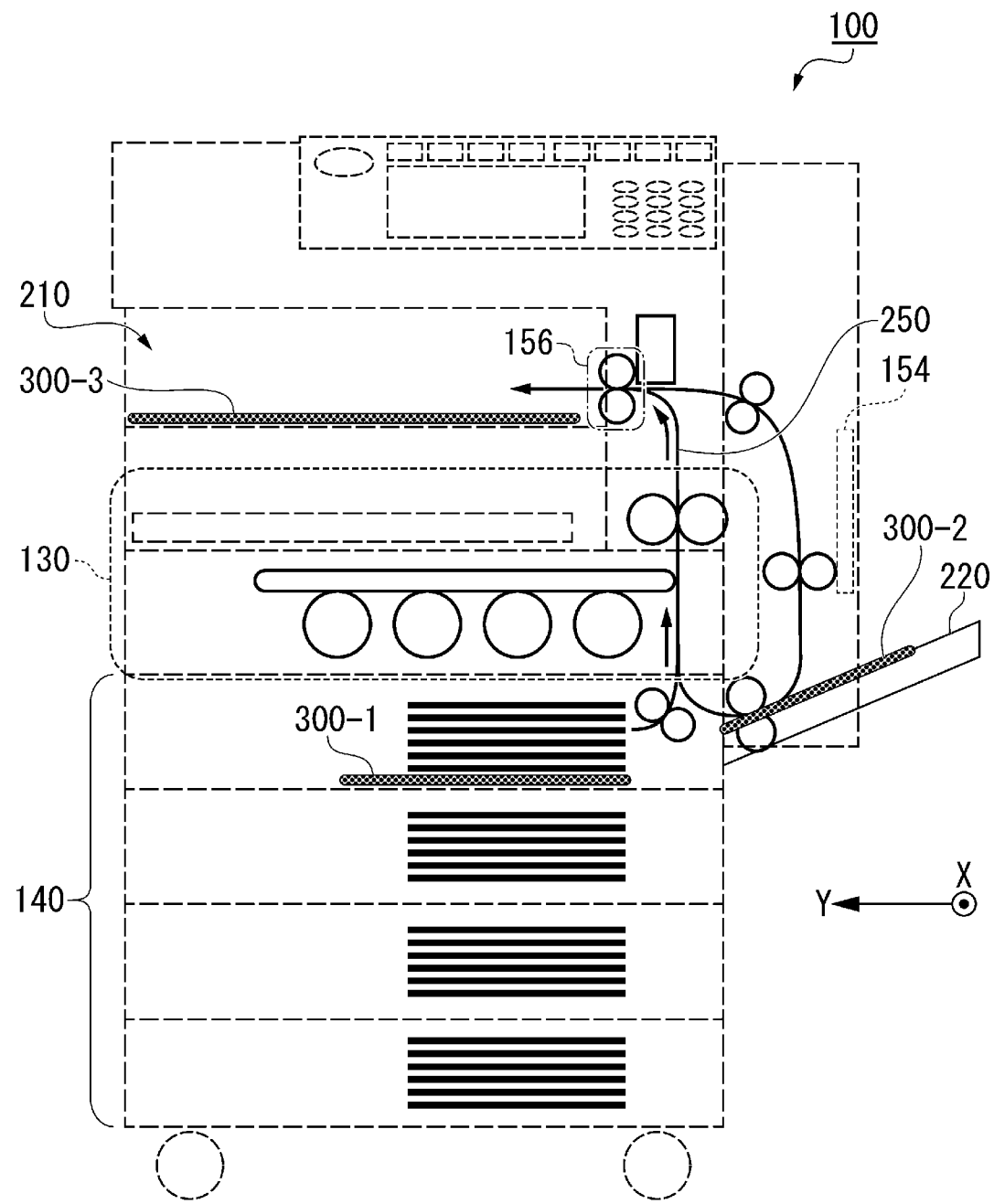
FIG. 3 is a diagram showing a specific example of an internal configuration.

FIG. 3 is a diagram showing an internal configuration of the image forming device 100. Further, FIG. 3 shows an example of the placement unit and an example of the conductor in the internal configuration. FIG. 3 newly shows a manual feed tray 220 and conductors 300-1, 300-2, and 300-3. The conductors 300-1, 300-2, and 300-3 are expressed as a conductor 300 when not distinguished from each other. In the present embodiment, the sheet storage unit 140, the manual feed tray 220, and the paper discharge unit 210 are taken as examples of the placement unit. The sheet storage unit 140 and the manual feed tray 220 are examples of the placement unit in which the sheet before the image is formed thereon is placed. The paper discharge unit 210 is an example of the placement unit in which the sheet after the image is formed thereon is placed.

A communication range of the wireless tag communication unit 154 extends to the sheet storage unit 140, the manual feed tray 220, and the paper discharge unit 210. Therefore, in the present embodiment, by providing the conductor on the placement unit, communication between the wireless tag attached to the sheet placed on the placement unit and the wireless tag communication unit 154 is hindered. Specifically, when the sheet is placed on the conductor, impedance of the wireless tag attached to the sheet decreases, so that the communication is difficult. The conductor 300 is a material that easily conducts electricity, such as aluminum. Further, the conductor 300 shown in FIG. 3 is formed in a plate shape. In FIG. 3, a side surface of the plate-shaped conductor 300 is drawn.

The conductor 300-1 is provided in an uppermost paper feed cassette of the sheet storage unit 140. The conductor 300-1 hinders communication between the wireless tag attached to the sheet placed in the uppermost paper cassette and the wireless tag communication unit 154. Even if only one sheet is placed in the uppermost paper cassette, the conductor 300-1 also hinders the communication between the wireless tag attached to the sheet and the wireless tag communication unit 154. The conductor is provided in the uppermost paper cassette as an example, however, the conductor may be provided in another paper cassette.

The conductor 300-2 is provided in the manual feed tray 220. The conductor 300-2 hinders communication between the wireless tag attached to the sheet placed in the manual feed tray 220 and the wireless tag communication unit 154. Even if only one sheet is placed on the manual feed tray 220, the conductor 300-2 also hinders the communication between the wireless tag attached to the sheet and the wireless tag communication unit 154.

The conductor 300-3 is provided on the paper discharge unit 210. The conductor 300-3 hinders communication between the wireless tag attached to the sheet placed on the paper discharge unit 210 and the wireless tag communication unit 154. Even if only one sheet is placed on the paper discharge unit 210, the conductor 300-3 also hinders the communication between the wireless tag attached to the sheet and the wireless tag communication unit 154. The sheet to be discharged to the paper discharge unit 210 is discharged by paper discharge rollers 156. A paper discharge position of the sheet may vary depending on paper discharge momentum. Therefore, the conductor 300-3 is provided to cover the entire paper discharge unit 210.

In FIG. 3 described above, a direction toward the left is set as a Y-direction, and a direction from front to back is set as an X-direction.

Figure 4A:
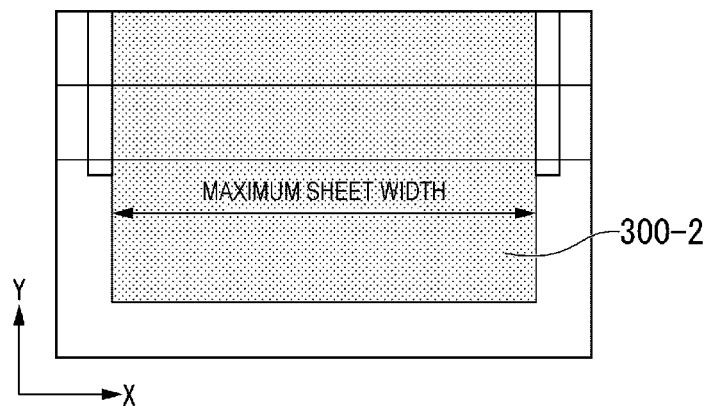
FIG. 4A is a view of a manual feed tray as seen from above.
Figure 4B:
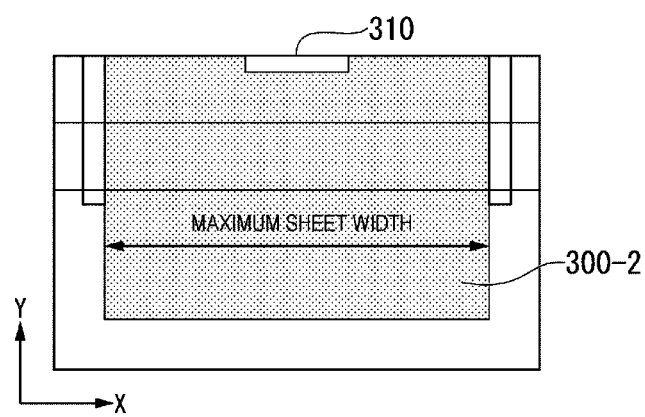
FIG. 4B is a view of the manual feed tray as seen from above.
Figure 4C:
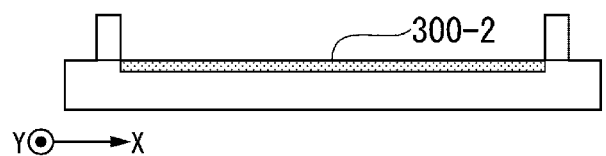
FIG. 4C is a view of the manual feed tray as seen from front to back in a Y-direction.
Figure 4D:
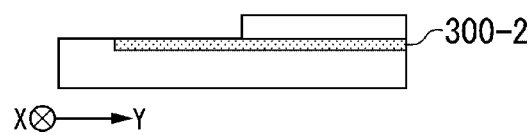
FIG. 4D is a view of the manual feed tray as seen from back to front in an X-direction.

FIGS. 4A, 4B, 4C, and 4D are views showing an installation example of the conductor 300-2 in the manual feed tray 220. FIGS. 4A and 4B are views of the manual feed tray 220 as seen from above. FIG. 4C is a view of the manual feed tray 220 as seen from front to back in the Y-direction. FIG. 4D is a view of the manual feed tray 220 as seen from back to front in the X-direction.

As shown in FIGS. 4A and 4B, a size of the conductor 300-2 is large enough to cover an entire sheet with a maximum sheet size on which an image can be formed by the image forming device 100. As a result, the conductor 300-2 can hinder the communication regardless of the sheet size. The conductor 300-2 shown in FIG. 4B is in a shape in which a portion of a region 310 is cut off, which is to prevent a paper feed roller for feeding the sheet and the conductor 300-2 from coming into contact with each other when the paper feed roller is provided in the region 310.

As shown in FIGS. 4C and 4D, a recess is prepared for providing the conductor 300-2 in the manual feed tray 220, and the conductor 300-2 is inserted in this recess, and thus the conductor 300-2 is provided such that a sheet placement surface is flat.

Figure 5:
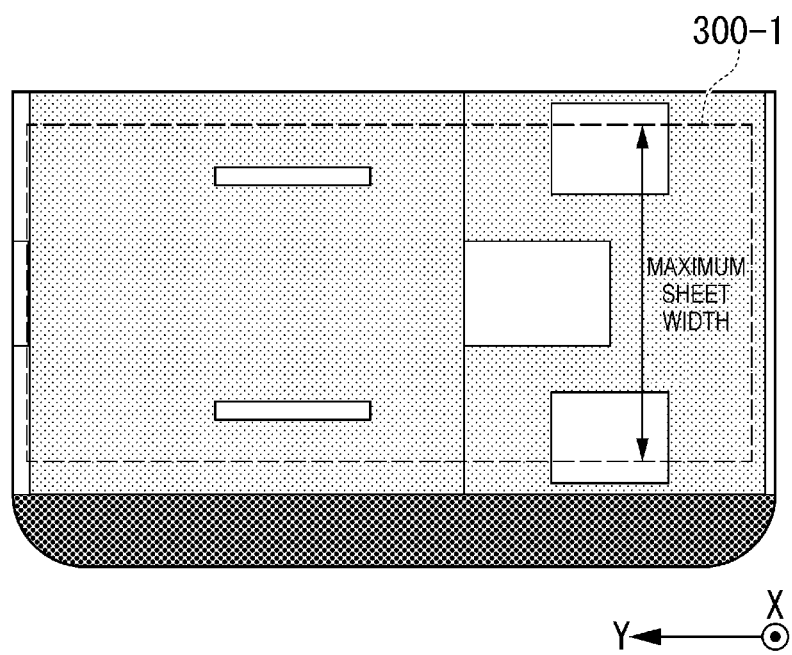
FIG. 5 is a view showing an installation example of a conductor in a sheet storage unit.

FIG. 5 is a view showing an installation example of the conductor 300-1 in the sheet storage unit 140. The size of the conductor 300-1 is large enough to cover the entire sheet with the maximum sheet size on which an image can be formed by the image forming device 100. As a result, the conductor 300-1 can hinder the communication regardless of the sheet size. A metal plate for feeding paper is provided in the paper feed cassette of the sheet storage unit 140. The conductor 300-1 may be provided to cover the region in which the metal plate is not present.

As described above, the conductor 300 is large enough to cover the entire sheet, and thus is always provided at a position in which the conductor overlaps with the wireless tag. The size of the conductor does not have to be large enough to cover the entire sheet with the maximum sheet size. For example, a user may use only A4 size sheets and not use A3 size sheets. In this way, it is predetermined that a sheet with a size smaller than the maximum sheet size will be used, and when the position of the wireless tag on the sheet is unknown, a conductor that is large enough to cover the entire sheet with a sheet size to be used may be provided. That is, a conductor with a size corresponding to a sheet size used by a user may be provided. In this way, it is unnecessary to provide a conductor with an unnecessarily large size, and the cost of the conductor can be reduced.

When the position on the sheet to which the wireless tag is attached is predetermined, the conductor 300 may be provided to cover the region to which the wireless tag is attached instead of the entire sheet.

Figure 6:
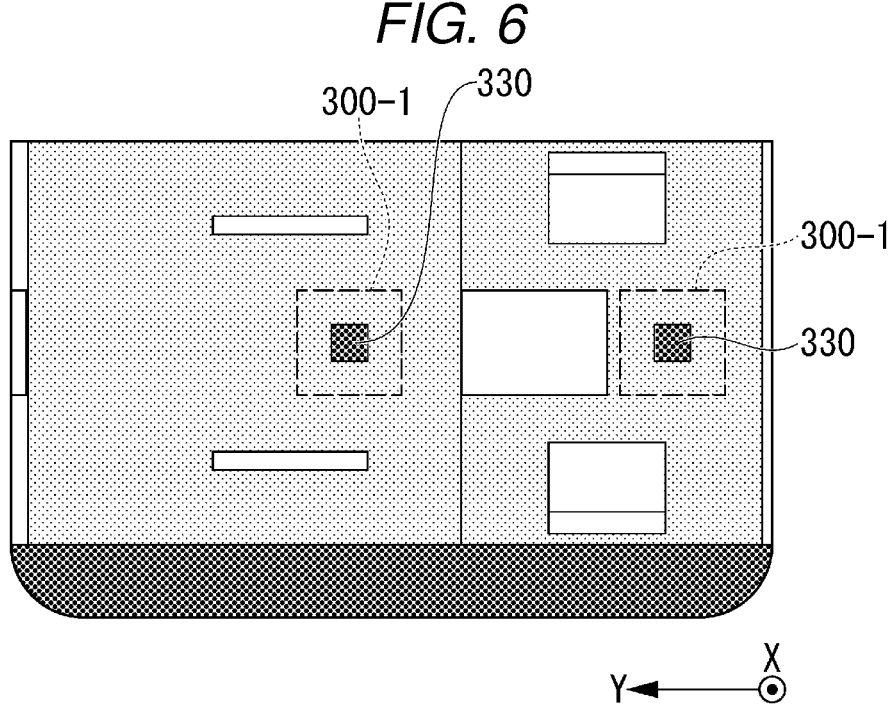
FIG. 6 is a view showing an example of providing a conductor 300 to cover a position to which a wireless tag is attached.

FIG. 6 is a view showing an example of providing the conductor 300 to cover the position to which the wireless tag is attached instead of the entire sheet. For example, regions 330 are defined as regions to each of which the wireless tag attached to the sheet is attached. The conductor 300-1 may be provided to cover the region 330. In this case, the conductor 300-1 can also hinder the communication with the wireless tag communication unit 154.

Figure 7:
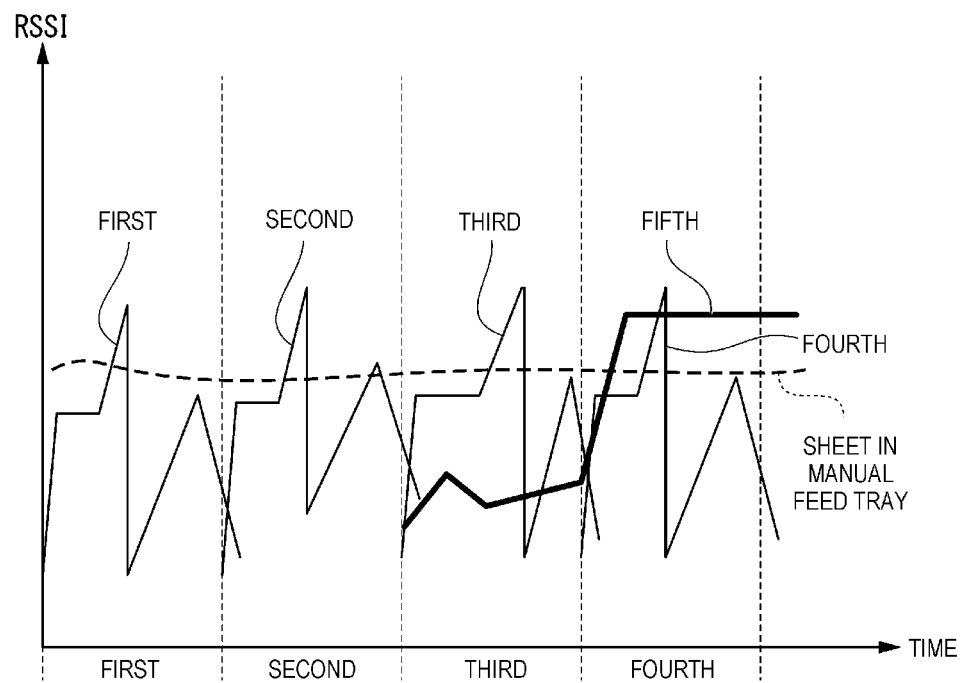
FIG. 7 is a diagram showing RSSI before the conductor is provided.
Figure 8:
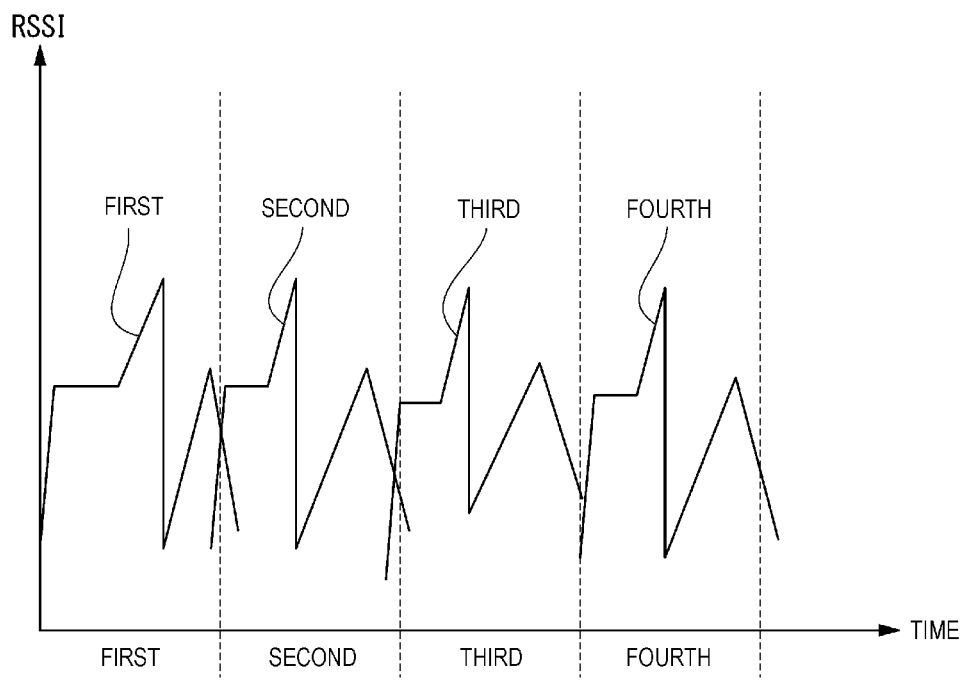
FIG. 8 is a diagram showing RSSI after the conductor is provided.

Next, experimental results of measuring received signal strength indication (RSSI) before and after the conductor 300 is provided will be introduced. FIG. 7 is a diagram showing RSSI before the conductor 300 is provided. FIG. 8 is a diagram showing RSSI after the conductor 300 is provided. Both FIGS. 7 and 8 show RSSI from when five sheets are placed in the sheet storage unit 140 to when one sheet is conveyed each time from a first sheet to a fourth sheet and an image is formed. Further, only one sheet is placed in the manual feed tray 220.

Vertical axes of the graphs of FIGS. 7 and 8 indicate RSSI, and horizontal axes indicate time. As shown in FIG. 7, it is shown that only a signal from a RFID is received from a wireless tag attached to each of the first to third sheets. However, by conveying the fourth sheet, only the fifth sheet is placed in the sheet storage unit 140. As a result, a radio wave from the wireless tag attached to the fifth sheet is also received, so that the wireless tag communication unit 154 cannot distinguish between the fourth sheet and the fifth sheet. Thus, the wireless tag communication unit 154 may incorrectly write the write information to the wireless tag attached to the fifth sheet. A signal is received from the sheet placed in the manual feed tray 220 with almost constant radio field strength, and thus in this case as well, the write information may be incorrectly written on the wireless tag attached to the sheet placed in the manual feed tray 220.

Meanwhile, by providing the conductor 300, as shown in FIG. 8, only a signal from a RFID is received from the wireless tag attached to each of the first to third sheets. No signal is received from the wireless tag attached to the fifth sheet and the wireless tag attached to the sheet placed in the manual feed tray 220. Therefore, since the wireless tag communication unit 154 does not make the sheets indistinguishable, information can be prevented from being incorrectly written to the non-target wireless tag.

In the above embodiment, the sheet storage unit 140, the manual feed tray 220, and the paper discharge unit 210 are mentioned as the placement unit in which the conductor 300 is provided, but the conductor 300 may not be provided in all of these parts.

Specifically, as a confirmation in which the conductor 300 is not provided in all of these parts, two configurations will be described specifically. In a first configuration A, the conductor 300 is provided in a placement unit in which a sheet before information is written to a wireless tag thereof by the wireless tag communication unit 154 is placed, but is not provided in a placement unit in which a sheet after information is written to a wireless tag thereof by the wireless tag communication unit 154 is placed. In the present embodiment, the placement unit in which the sheet before the information is written to the wireless tag thereof is placed is the sheet storage unit 140 or the manual feed tray 220. The placement unit in which the sheet after the information is written to the wireless tag thereof is placed is the paper discharge unit 210.

In a second configuration B, the conductor 300 is provided in the placement unit in which a sheet provided with a wireless tag whose identification information that can uniquely identify the wireless tag by the wireless tag communication unit 154 is unknown is placed, but is not provided in the placement unit in which a sheet provided with a wireless tag whose identification information is known is placed.

The wireless tag communication unit 154 acquires identification information from the wireless tag when writing the write information. Therefore, the configurations A and B can be implemented by the wireless tag communication unit 154 storing identification information of a wireless tag, to which the write information is written, in an own storage device. In this case, "the placement unit in which a sheet provided with a wireless tag . . . unknown is placed" in the configuration B is the sheet storage unit 140 or the manual feed tray 220. Further, "the placement unit in which a sheet provided with a wireless tag whose identification information is known is placed" in the configuration B is the paper discharge unit 210.

It is assumed that the wireless tag communication unit 154 receives signals from the wireless tag which is attached to the sheet being conveyed and to which the written information is not written and the wireless tag to which the written information is written. In this case, the wireless tag communication unit 154 writes by designating not the stored identification information (known identification information) but the un-stored identification information, that is, unknown identification information. As a result, the wireless tag to which the write information is written can be excluded, so that the write information can be prevented from being incorrectly written to the non-target wireless tag.

As described above, the paper discharge position of the sheet discharged to the paper discharge unit 210 varies, but for example, by providing a positioning mechanism, the sheets can be discharged such that there is no variation. In this case, when two or more sheets are discharged, the wireless tags overlap, which makes communication difficult. Therefore, when the sheets are discharged such that there is no variation in the paper discharge position, it is sufficient for the wireless tag communication unit 154 to only store the identification information of the wireless tag attached to the first sheet.

According to the embodiment described above, since communication with the non-target wireless tag is hindered by providing the conductor in the placement unit, the information can be prevented from being incorrectly written to the non-target wireless tag.

While certain embodiments have been described, these embodiments have been presented by way of example only, and are not intended to limit the scope of the disclosure. These embodiments can be carried out in various other forms, and various omissions, replacements, and modifications can be made thereto without departing from the spirit of the disclosure. These embodiments and modifications thereof are included in the scope and spirit of the disclosure, as well as in the scope of the disclosure described in the scope of claims and the equivalent scope thereof.

What is claimed is:

1. An image forming device, comprising:
    a placement component configured to accommodate a sheet provided with a wireless tag;
    a wireless tag communication writer configured to write information to the wireless tag provided on the sheet conveyed from the placement component; and
    a conductor provided in the placement component, the conductor configured to hinder communication between the wireless tag communication writer and the wireless tag provided with the sheet placed on the conductor,
    wherein the placement component comprises a recess configured to receive the conductor, and wherein the conductor is provided such that a sheet placement surface is flat.

2. The image forming device according to claim 1, further comprising:
    a printer unit that forms an image on the sheet, wherein the sheet on which the image is formed is a sheet stored in the placement component.

3. The image forming device according to claim 1, further comprising:
    a discharge unit to which the sheet on which an image is formed is discharged.

4. The image forming device according to claim 1, wherein
    the conductor is provided at a position at which the conductor overlaps with the wireless tag.

5. The image forming device according to claim 1, wherein
    the conductor is provided in a placement component in which the wireless tag communication writer has not yet written information to the wireless tag of the sheet accommodated in the placement component, but the conductor is not provided in a placement component in which the wireless tag communication writer has already written information to the wireless tag of the sheet accommodated in the placement component.

6. The image forming device according to claim 1, wherein
    a sheet is placed in the placement component before an image is formed thereon, or a sheet is placed in the placement component after an image is formed thereon.

7. The image forming device according to claim 1, further comprising:
    a conveying path through which passes the wireless tag to be written and in which the wireless tag communication writer writes information to the wireless tag by emitting a radio wave from an antenna.

8. The image forming device according to claim 1, wherein
    a communication range of the wireless tag communication writer extends to the placement component.

9. The image forming device according to claim 1, wherein the placement component comprises a manual feed tray.

10. An apparatus to reduce unintended RFID writing, comprising:
    a placement component configured to accommodate a sheet provided with a wireless tag;
    a wireless tag communication writer configured to write information to the wireless tag provided on the sheet conveyed from the placement component; and a conductor provided in the placement component, the conductor configured to hinder communication between the wireless tag communication writer and the wireless tag provided with the sheet placed on the conductor, wherein the placement component comprises a recess configured to receive the conductor, and wherein the conductor is provided such that a sheet placement surface is flat.

11. The apparatus according to claim 10, further comprising:
   a printer unit that forms an image on the sheet, wherein the sheet on which the image is formed is a sheet stored in the placement component.

12. The apparatus according to claim 10, further comprising:
   a discharge unit to which the sheet on which an image is formed is discharged.

13. The apparatus according to claim 10, wherein the conductor is provided at a position at which the conductor overlaps with the wireless tag.

14. The apparatus according to claim 10, wherein the conductor is provided in a placement component in which the wireless tag communication writer has not yet written information to the wireless tag of the sheet accommodated in the placement component, but the conductor is not provided in a placement component in which the wireless tag communication writer has already written information to the wireless tag of the sheet accommodated in the placement component.

15. The apparatus according to claim 10, wherein a sheet is placed in the placement component before an image is formed thereon, or a sheet is placed in the placement component after an image is formed thereon.

16. The apparatus according to claim 10, further comprising:
   a conveying path through which passes the wireless tag to be written and in which the wireless tag communication writer writes information to the wireless tag by emitting a radio wave from an antenna.

17. The apparatus according to claim 10, wherein a communication range of the wireless tag communication writer extends to the placement component.

18. The apparatus according to claim 10, wherein the placement component comprises a manual feed tray.

19. A method of mitigating unintended wireless tag writing in an image forming device, comprising:
   writing information to a wireless tag provided on a sheet conveyed from a placement component using a wireless tag communication writer; and
   hindering communication between the wireless tag communication writer and the wireless tag provided with the sheet placed on a conductor using a conductor provided in the placement component,
   wherein the placement component comprises a recess configured to receive the conductor, and wherein the conductor is provided such that a sheet placement surface is flat.

20. The method according to claim 19, wherein the placement component comprises a manual feed tray.

* * * * *